(12) United States Patent
Winkelbach et al.

(10) Patent No.: US 10,801,834 B2
(45) Date of Patent: Oct. 13, 2020

(54) FRINGE PROJECTION FOR DETERMINING TOPOGRAPHY OF A BODY

(71) Applicant: Hewlett-Packard Development Company, L.P., Houston, TX (US)

(72) Inventors: Simon Winkelbach, Braunschweig (DE); Sven Molkenstruck, Braunschweig (DE); Markus Rilk, Braunschweig (DE)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/569,211

(22) PCT Filed: May 30, 2016

(86) PCT No.: PCT/EP2016/062100
§ 371 (c)(1),
(2) Date: Oct. 25, 2017

(87) PCT Pub. No.: WO2016/202562
PCT Pub. Date: Dec. 22, 2016

(65) Prior Publication Data
US 2018/0112975 A1     Apr. 26, 2018

(30) Foreign Application Priority Data

Jun. 17, 2015   (DE) .................. 10 2015 109 721

(51) Int. Cl.
*G01B 11/25*     (2006.01)
*G06T 3/00*      (2006.01)

(52) U.S. Cl.
CPC ........ *G01B 11/2527* (2013.01); *G01B 11/254* (2013.01); *G06T 3/0031* (2013.01)

(58) Field of Classification Search
CPC .. G01B 11/254; G01B 11/2527; G06T 3/0031
See application file for complete search history.

(56) References Cited

U.S. PATENT DOCUMENTS

| 6,930,704 B1 | 8/2005 | Hamada |
| 8,436,890 B2 | 5/2013 | Mamiya |

(Continued)

FOREIGN PATENT DOCUMENTS

| CN | 1302999 A | 7/2001 |
| CN | 102607465 A | 7/2012 |

(Continued)

OTHER PUBLICATIONS

Wang et al~"Novel Phase-Coding Method for Absolute Phase Retrieval"~Optics Letters~vol. 37~No. 11~Jun. 1, 2012~3 pages.

(Continued)

*Primary Examiner* — Hwa Andrew Lee
(74) *Attorney, Agent, or Firm* — HP Inc. Patent Department (57) ABSTRACT

A fringe projection method for determining the topography of a body (12) comprising the steps: projecting a series of sets of patterns (Ti) onto a surface (20) of the body (12), wherein each set has at least two patterns (Ti) and wherein each pattern (Ti) has S fringes; for each pattern (Ti), recording an image (24.i) of the surface (20) having the projected pattern, so that a sequence of recordings is formed; and calculating the topography from the images (24.i), wherein such patterns are projected in which each fringe has an intensity distribution perpendicular to the fringe longitudinal direction (L) and each intensity distribution can be expressed by a function (Q) which has a spatial phase position (β). According to the invention, the phase position (β) changes as a function of a code ($g_{(s)}$) of the ordinal number (s) of the fringe.

9 Claims, 4 Drawing Sheets

(56) References Cited

U.S. PATENT DOCUMENTS

| | | |
|---|---|---|
| 2011/0080471 A1 | 4/2011 | Song |
| 2012/0176478 A1 | 7/2012 | Wang et al. |
| 2015/0070473 A1 | 3/2015 | Wang |

FOREIGN PATENT DOCUMENTS

| | | |
|---|---|---|
| CN | 102322823 B | 1/2013 |
| CN | 102519390 B | 1/2015 |

OTHER PUBLICATIONS

Giovanna Sansoni: 3D Imager for Dimensional Gauging of Undustrial Workpieces.

Giovanna Sansoni: Three-dimensional vision based on a combination of gray-code and phase-shift light projection.

FRINGE PROJECTION FOR DETERMINING TOPOGRAPHY OF A BODY

The present invention refers to a fringe projection method for determining the topography of a body, comprising the steps (a) projecting a sequence of sets of patterns onto a surface of the body, wherein each set has at least two patterns and wherein each pattern has S fringes, (b) for each pattern, recording an image of the surface having the projected pattern, so that a sequence of recordings is formed, and (c) calculating the topography from the images.

According to a second aspect, the invention refers to a fringe projection device for determining the topography of a body, with (i) a projector for projecting a sequence of sets of patterns onto the surface of the body, (ii) a camera for recording an image of the surface having the projected pattern and (iii) a controller, which is connected to the projector and the camera. According to a third aspect, the invention refers to a computer program product.

In order to measure the topography of a body, active triangulation methods are used, for example. Herein, a projector successively projects a plurality of light patterns onto the surface of the body to be measured and images of the surface illuminated by the pattern are recorded by a camera, which is usually laterally offset with respect to the projector. All these methods share the fact that the observation rays of the camera are geometrically intersected with the respective corresponding illumination ray or the respective corresponding illumination plane of the projector. The determination of the correspondence between camera pixels and projector pixels or projector line is called the correspondence problem.

In order to solve the correspondence problem, various projection patterns have been proposed. It is known, for example, to irradiate the body with a sequence of fringe patterns, wherein the fringes follow a Gray code according to a temporally sequential pattern. Herein, it is advantageous that the calculation of points of the surface of the body is more robust for those camera pixels which have a brightness value which does not allow to unequivocally ascertain whether or not the associated point on the surface of the body has been illuminated.

In such a fringe projection method, there is a drawback in that the reflecting, for instance glossy, surfaces can only be measured with great difficulty. Particularly unreliable is such a fringe projection method in the case of bodies, whose surface is shaped in such a way as to possibly generate multiple reflections.

US 2011 008 471 A1 discloses a method, in which, on one hand, a fringe projection based on the Gray code and, on the other hand, a projection with a sinusoidal intensity distribution are used. Data obtained by the two different projections are used together in order to calculate the shape of the sample body. In such a method, a drawback is the relatively long measuring time, since two different sets of fringe patterns have to be projected.

DE 11 2008 002 148 T5 discloses a method, which uses a fringe-like light pattern, used for spatial encoding, and a fringe-like light pattern, which is used for a phase shift method. In this method, two separate series of variable patterns have to be projected onto the object.

U.S. Pat. No. 6,930,704 B1 discloses a method, in which a fringe pattern is projected, wherein the intensity distribution in each fringe may have an amplitude modulation. Phase encoding is not used.

In the article by Sansoni et al., "3D Imager for Dimensional Gauging of Industrial Workpieces; State of the Art of the Development of a Robust and Versatile System"; Proceedings of International Conference on Recent Advances in 3-D Digital Imaging and Modeling, 1997, pages 19-26, the Gray-code projection method is also combined with the phase shift method, wherein in this method also two respective sets of patterns have to be projected onto the sample.

The same approach can be found in the paper by Sansoni et al., "Three-dimensional vision based on a combination of gray-code and phase-shift light projection: analysis and compensation of systematic errors"; Applied Optics, vol. 38, no. 31, 1999, pages 6565-6573.

The known methods have the disadvantage that they have a low robustness with respect to diffuse and/or blurry multiple reflections.

The object of the invention is to propose an improved method of fringe projection.

The invention achieves this object by means of a fringe projection method of the generic type, in which each fringe has an intensity distribution perpendicular to the fringe longitudinal direction and each intensity distribution can be expressed by a function, which has a spatial phase position, which is a function of the ordinal number of the fringe.

According to a second aspect, the invention solves the problem by means of a fringe projection device of the generic type, whose controller is adapted for automatically performing an inventive method. According to a third aspect, the invention solves the problem by means of a computer program product according to claim 10.

The advantage of the invention is that due to the intensity distribution changing as a function of the ordinal number, based on the light intensity, which is recorded by a camera pixel, the position recorded by the camera pixel can be deduced with high precision. If reflections take place, the contribution of reflected light to amplitude, i.e. the total intensity of light varying through the image sequence, which is recorded by a predetermined camera pixel, is low with respect to the contribution of light, which is not subject to multiple reflections. Therefore, the invention allows measurements also of reflecting, in particular glossy bodies.

It is also advantageous that the spatial resolution is not limited by the fringe width of the smallest fringe.

A further advantage lies in the higher robustness with respect to diffuse or blurry reflections. In such reflections, a low-pass filtering of the pattern signal takes place during the transmission from a surface to the other. This means that low frequency patterns are transmitted, while high frequency patterns are weakened. In this way, high frequency patterns cause less interference. In the invention, contrary to a conventional fringe projection method based on the Gray code, an additional high frequency pattern is projected, which leads to an improved robustness.

In the context of the present description, the topography comprises the three-dimensional coordinates of the surface of the body and the reflection behavior.

The fringe longitudinal direction is intended as the direction, in which the fringe is extended. In other words, the fringe longitudinal direction is the direction along which one can follow the fringe, without incurring in intensity variations. In the further description, this direction is considered to be the y-direction.

The intensity distribution is in particular considered an image, which associates the light intensity to positions perpendicular to the fringe longitudinal direction. The position perpendicular to the fringe longitudinal position is the x-direction.

The pattern is considered as the entirety of other adjacent fringes.

The phase position is considered the term in the argument of the function, which describes the intensity distribution, which does not depend on the coordinate. The phase is considered as the entire argument of this function.

It is advantageous, if the function contains a periodic term or if it is a periodic function, since this facilitates the evaluation. However, it is also possible that the function is monotonically rising or falling in portions thereof, without being periodic. This complicates the evaluation, while improving the precision of the evaluation in certain situations. If the function is a periodic function, it is advantageous if the spatial wavelength is at least equal to the fringe width.

The characteristic, that the phase position is a function of the ordinal number of the fringe means, in particular, that a function exists, which associates a phase position to each ordinal number.

The projection in particular comprises the emission of light, which allows the determination of the topography of the body based on the reflected light. It is possible, but not necessary, that light focusing components are used for projection. This allows sharp pattern projections onto opaque surfaces. However, it is also possible that the sequence of sets of patterns is projected by means of a display.

According to a preferred embodiment, the function is periodic and the intensity distributions of patterns of one set, in particular all intensity distributions, have the same spatial frequency. This facilitates the evaluation.

It is advantageous if the phase position changes as a function of a code of the ordinal number of the fringe, in particular of only one position of a code word of the ordinal number. This allows the calculation of the topography with a relatively small calculation effort. The code is not considered to be a trivial code, which assigns to a number exactly the same number.

The code preferably has a Hamming distance of 1. This increases the robustness of the fringe projection method. It is particularly advantageous if the code is an N-Gray code, wherein the code alphabet is comprised of N symbols. In this case, the phase position is a function of the Gray code of the ordinal number of the fringe. The Gray code preferably is binary, ternary, quaternary, quinary, senary, septenary or octal Gray code.

The phase positions of all K-patters within one set are preferably different from each other. It is then possible to univocally deduce the fringes from the phase positions, and calculate, based on the fringes, the 3D coordinates of the illuminated point of object.

Preferably the colors of at least two patterns in the same set differ from each other. It is then possible to project two, three or more patterns simultaneously onto the body, and evaluate the individual colors separately from each other. Thus, the measurement time is greatly reduced. If a particularly high spatial resolution is desired, it is however usually advantageous to project a monochrome or grey pattern onto the surface of the body and record the images of the surface by means of a monochrome camera. This type of camera usually has, due to their chip characteristics, a higher spatial resolution and light sensibility.

It is advantageous, if the phase position in the s-th fringe of k-th pattern in m-th set contains the sum of a first term, which contains s, however not k, and a second term, which contains k, however not s or m. In this way, by comparing the recorded images for different patterns and/or different sets for the same point on the body, the position of the projector pixel and therefore the position of the point on the surface of the body may be univocally determined.

It is particularly advantageous, if the phase for the s-th fringe of the k-th pattern in the m-th set contains the term $360° \, Sx/X + k\phi + g_{s,m}\delta$. Based on this term, the determination of the x-coordinate of the light ray or light plane is readily performed from the measured light intensity.

It is particularly advantageous if the intensity Q at location x for the s-th fringe of k-th pattern in m-th set is expressed as:

$$Q_{k,s,m}(x) = a \, p \, [360° \, Sx/X + k\phi + g_{s,m}\delta] + bx + c.$$

Herein, p is preferably a periodic function, in particular a trigonometric function, a, b and c are constants with real values.

It is advantageous, if the phase shift parameter is determined by $|\delta| \leq 360°/(N-1)$, wherein $N = \#A$ and $A = \{0, 1, \ldots, N-1\}$ is the alphabet of the code. The phase shift parameter is preferably defined by $|\delta| = 360°/N$.

According to a preferred embodiment, the method comprises the steps (a) calculating the position of a light plane from the light intensities, that are measured with a camera pixel for the patterns at the same location and (b) calculating the 3D coordinates of this location by triangulating from the light plane and the light ray, which leads to this location. These steps are performed for multiple, in particular all, pixels of the camera.

The invention is explained in the following by means of attached drawings. In particular

Figure 1:
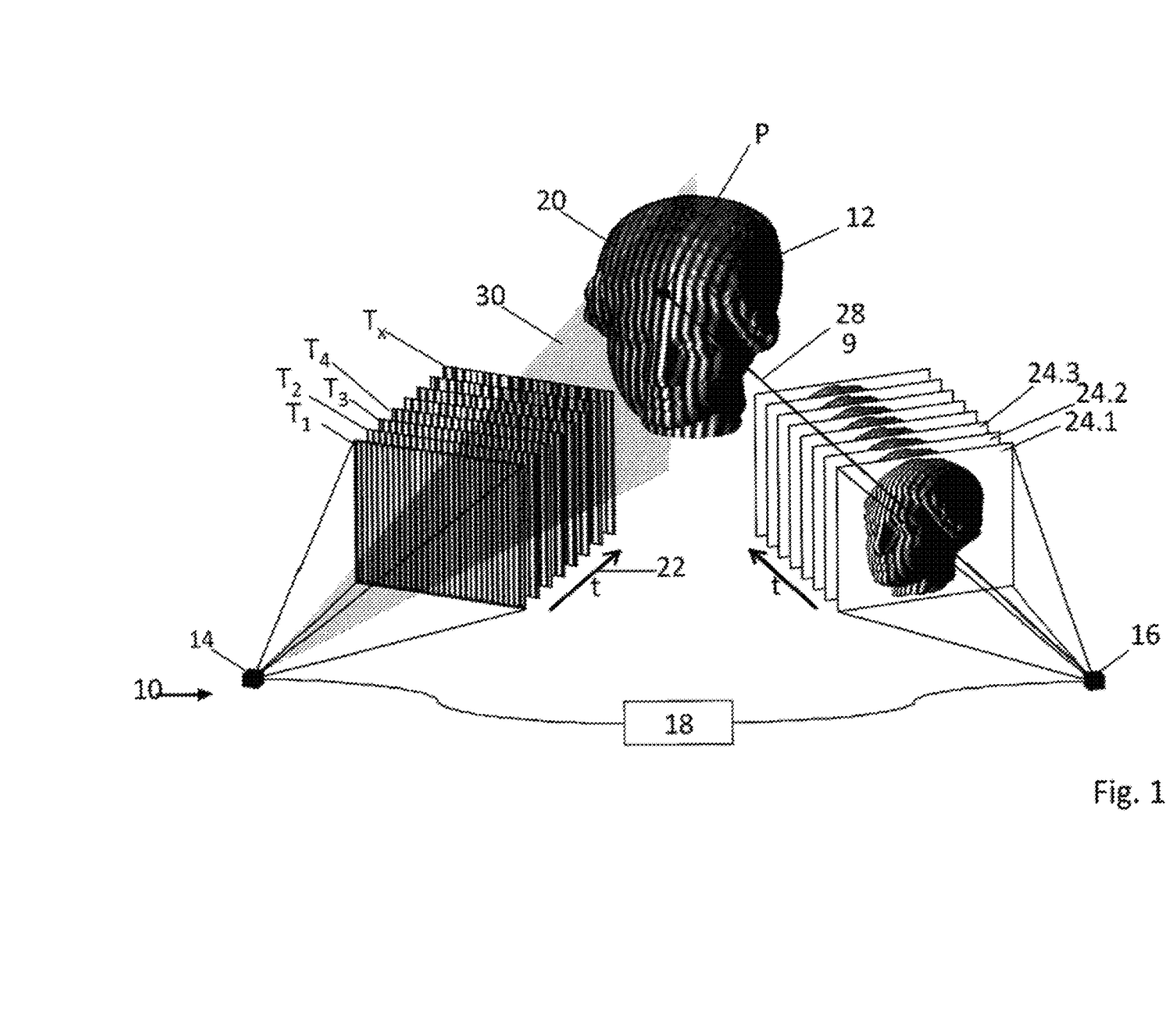
FIG. 1 shows a schematic view of an inventive fringe projection device for performing a method according to the invention.

FIG. 1 shows an inventive fringe projection device 10 for determining the topography of a body 12, which device has a projector 14, a camera 16 and a controller 18. The projector 14 is configured for projecting a sequence of sets of patterns $T_1, T_2, \ldots$ onto a surface 20 of body 12. The sequential patterns are drawn together, wherein a time ray 22 indicates that single patterns are projected according to a temporal sequence. It is to be noted that it is however also possible to project two or more patterns simultaneously, if the colors of patterns are different.

Due to the pattern $T_i$, which is projected onto the surface 20, a bright-dark-pattern is created on the surface 20. Camera 16 records, for each pattern, an image 24.

Figure 3:
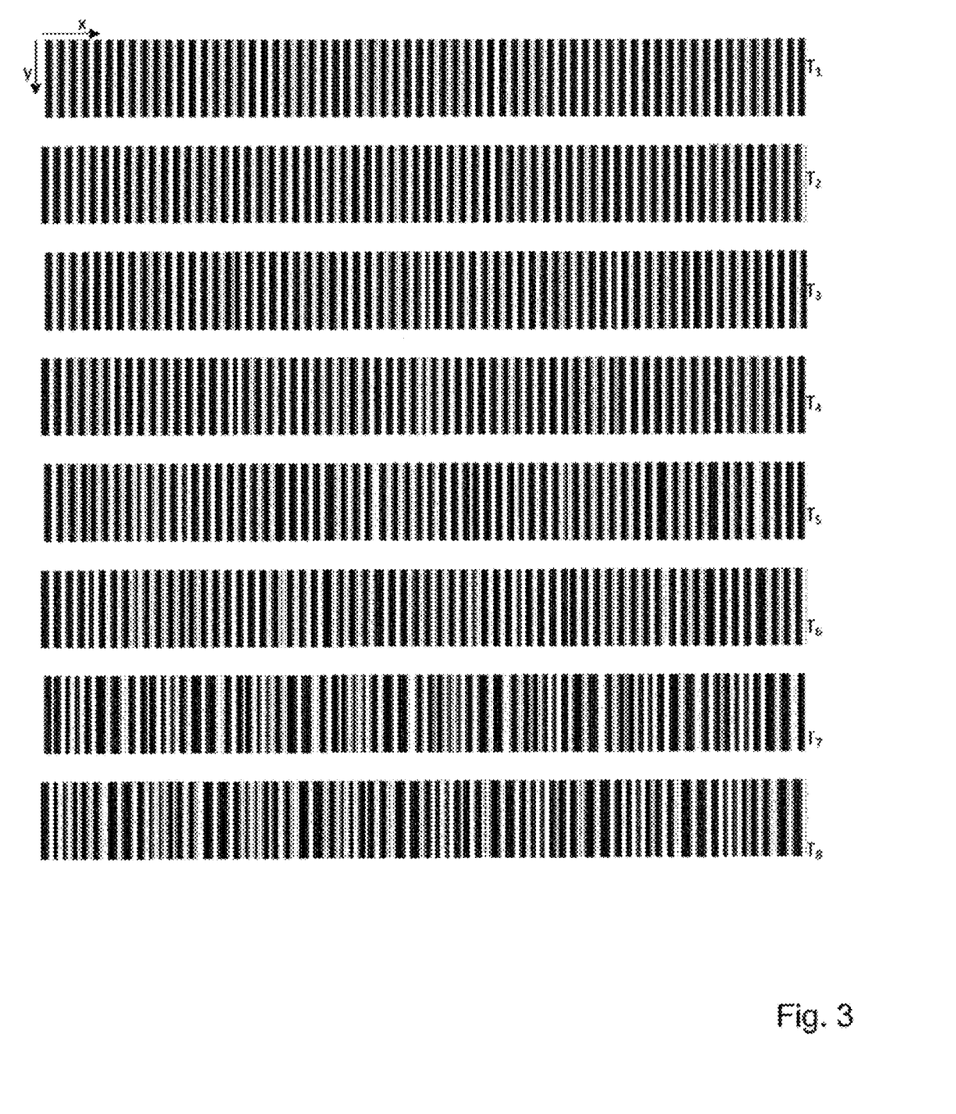
FIG. 3 shows a sequence of patterns, which are projected according to an embodiment.
Figure 4:
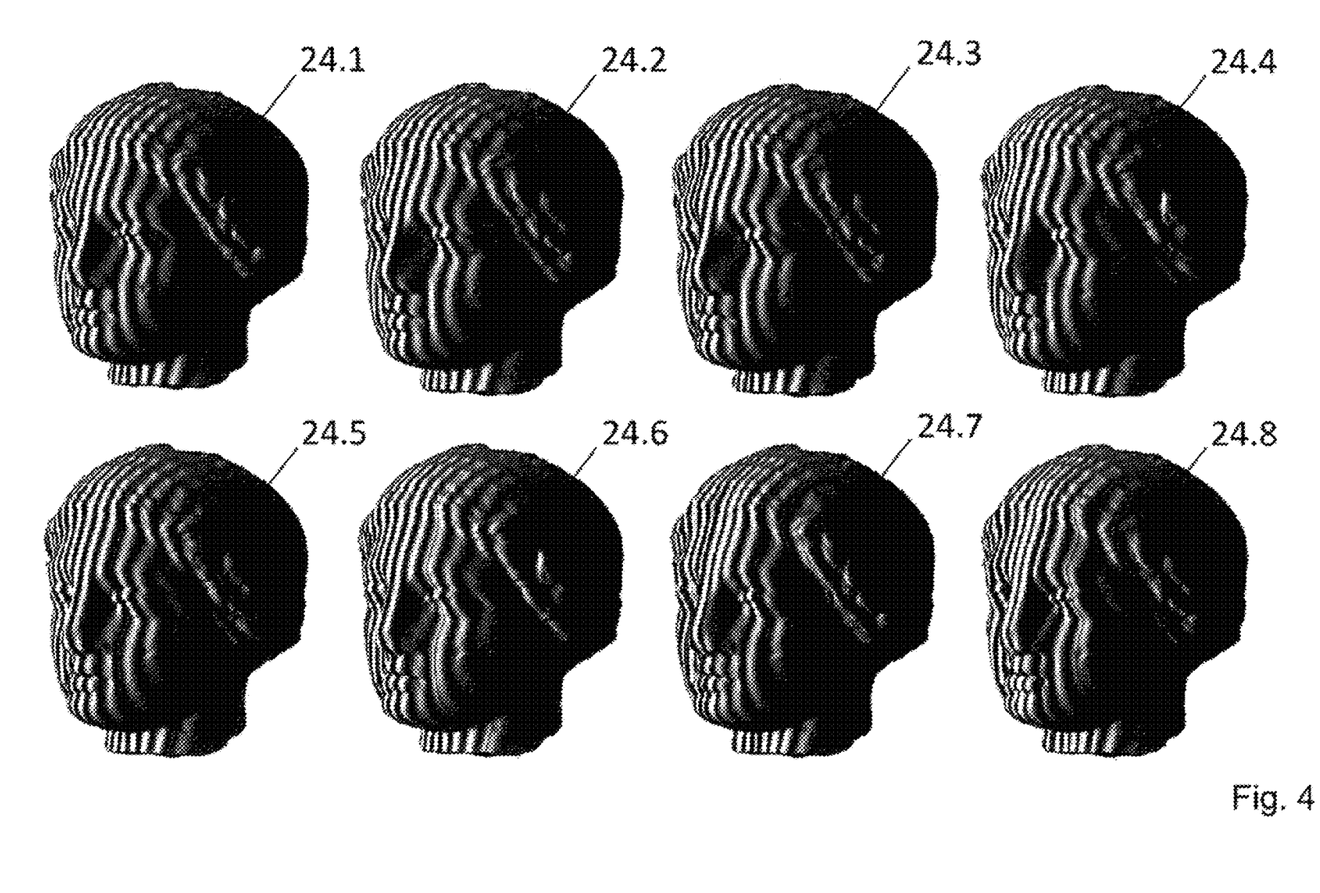
FIG. 4 shows an example of a sequence of camera images, which are generated by projecting patterns according to FIG. 3.

Camera records image 24.1 for the first patter $T_1$, image 24.2 for the second pattern $T_2$, and in general image 24.i for the i-th pattern. FIG. 3 shows images 24.1 to 24.8 for a possible embodiment of the inventive method.

In order to calculate the topography of body 12, in particular then the three-dimensional coordinates of surface 20 in a predetermined coordinate system, for each detection point of camera 16 a theoretical observation ray 28 is construed and intersected by a light plane 30. Based on the coordinates of projector 14 and camera 16 and the angles, at which the observation ray 28 and the light plane 30 extend, the coordinates of point P on the surface 20 is determined, which has been hit by the light plane 30 and which has been detected by the observation ray 28. This calculation is already known. The problem consists in determining the light plane 30 incident at point P based on the sequence of light intensities $\overline{Q}_{k,m}$ for a predetermined camera pixel.

The present description refers to a fringe projection method, in which a sequence of sets of patterns is projected onto a surface 20, which allows a particularly precise determination of the coordinates of points on surface 20. Moreover, the sequence of sets of patterns used in the inventive method is particularly suitable for measuring to bodies 12 with glossy surfaces.

Figure 2:
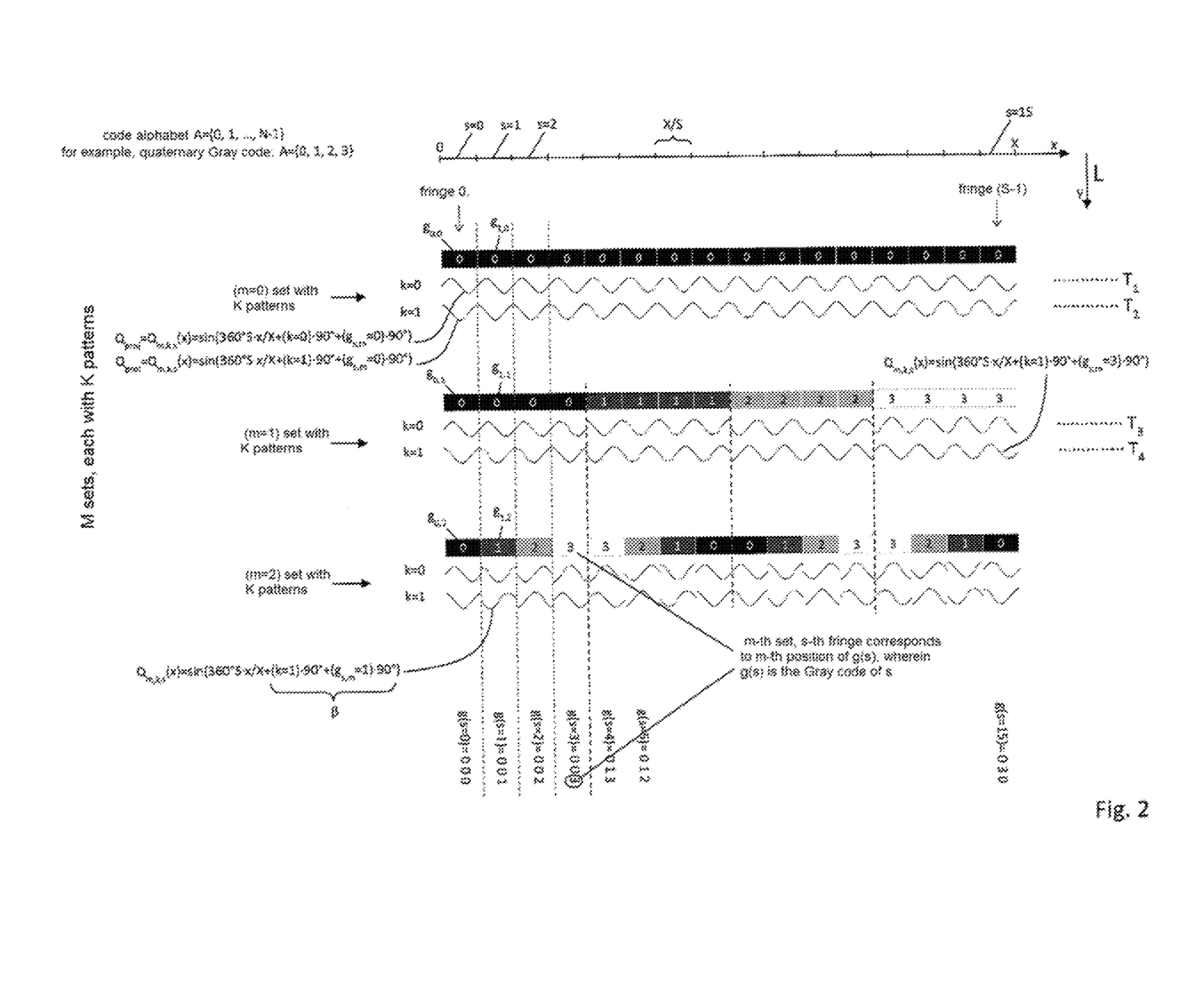
FIG. 2 shows a diagram explaining an embodiment of a method according to the invention.

FIGS. 1, 2 and 3 show that the patterns $T_i$ respectively have a constant number of S-fringes.

FIG. 2 shows a diagram for the sequence of sets of patterns for an inventive fringe projection method. In the uppermost part, the independent coordinate x is drawn. The y-direction, which is perpendicular to the x-direction, is indicated as the fringe longitudinal direction L. The brightness along the fringe longitudinal direction L for each fringe in a pattern $T_i$ is technically constant. This means that the projected light intensity $Q_{proj}$ may oscillate, although these oscillations are so small as to be negligible in the evaluation.

FIG. 2 schematically shows a sequence of sets of patterns $T_i$ for S=16 fringes. The number index s of fringes starts with 0, i.e. the fringes are numbered consecutively with s=0, s=1, ... s=15. In the coordinate system, the fringes extend within the interval [0, X], i.e. the smallest x-value is by definition 0, while the highest x-value is X.

In the lower section, the intensity distributions for the temporal sequence of patterns $T_1$, $T_2$, ... are shown. In the present case, $Q_{proj}=Q_{m,k,s}=\sin(360°\ Sx/X+k\phi+g_{s,m}\delta)$, wherein $\delta=360°/N$. N is the number of symbols in the alphabet of the Gray code in use. Thus, the intensity distribution for pattern $T_1$ is $Q_{proj}=\sin(360°\ Sx/X)$. The first pattern $T_1$ is part of the first set, thus m=0, and of the first pattern, thus k=0.

Since each set comprises K patterns, which are phase-shifted to each other by $\phi$, a K-dimensional intensity vector $\overline{Q}_m$ may be defined, the components of which are the intensities of the patter within a set. From the intensity vector $\overline{Q}_m$ a two-dimensional phase vector $\vec{\Psi}_m$ may be calculated.

It can be seen that both patterns in the first set, in the present case, are selected in a way that they are continuously merged at the boundaries, where two fringes are adjacent to each other.

In the second set in FIG. 2, four separated segments with respective four fringes, are present, wherein the intensity distributions are discontinuous at the boundaries between the four segments. In the third set the intensity distributions are discontinuous on all boundaries between adjacent fringes, except on those boundaries, at which in the previous pattern sets discontinuities were already present.

Based on the described sequence of sets of patterns, the topography of the body is computed based on the image points recorded by camera 16 (see FIG. 1) in the following way:

At the 0-th pattern set, i.e. m=0, the phase position is independent from the ordinal number s of fringe. This can be achieved in that for the 0-th position in the Gray code word g(s) of S the value 0 is always selected, i.e. $g_{s,0}=0$ for all $s\in(0, 1, \ldots, s-1)$.

This corresponds to an expansion of the Gray code of an additional 0-th position, i.e. for S=16 fringes, 3-digits code words are used, although for coding of 16 fringes with a quaternary Gray code, 2 digits would be sufficient.

Calculation of the Topography from Measurement Data

The intensity distribution of k-th pattern in m-th set is, as already described, $Q_{k,s,m}(x)=a\ p\ [360°\ Sx/X+k\phi+g_{s,m}\delta]+c$, with phase position $$\beta=k\cdot\phi+g_{s,m}\cdot\delta$$

The patterns are projected onto a body, are reflected by it and are recorded by a camera. The intensities $\overline{Q}_{k,m}$ incident on a respective camera pixel correspond to $$Q_{k,m}=\overline{a}\sin(360°\ Sx/X+k\phi+g_{s,m}\delta).$$

Herein, x still indicates the x-coordinate of pattern, which is responsible for the recorded intensity of the camera pixel. The value of x is thus constant but unknown (correspondence problem). Herein, s still indicates the ordinal number of fringe and is also constant although unknown.

The projector fringe s and the x-coordinate have to be computed, in order to solve the correspondence problem and to perform a triangulation. Moreover, the amplitude $\overline{a}$ arriving at the camera pixel is also unknown, since it is influenced by the reflective properties of body.

The offset c, or offset $\overline{c}$ in the intensities $\overline{Q}_{k,m}$ of camera pixels is eliminated by a usual preprocessing (by subtraction with other projected patterns). The knowns are thus S, X, k, $\phi$, m, $\delta$ as well as the encoding used for $g_{s,m}$. Initially s is sought, then x.

It is also assumed, that the 0-th pattern set (m=0 or reference signal) does not contain any phase shifting, thus $g_{s,0}=0$ for all $s\in\{0, 1, \ldots, S-1\}$. In case of projection of the 0-th pattern set, the intensities of the camera pixels are thus $$\overline{Q}_{k,0}=\overline{a}\sin(360°\ Sx/X+k\phi).$$

For the calculation of s and x, we initially group all intensities recorded in a camera pixel with $k\in\{0, 1, \ldots, K-1\}$ of a respective pattern set to form an intensity vector $\vec{Q}_m$ $$\vec{Q}_m = \begin{pmatrix} \overline{Q}_{0,m} \\ \overline{Q}_{0,m} \\ \vdots \\ \overline{Q}_{K-1,m} \end{pmatrix} = \begin{pmatrix} \overline{a}\cdot\sin(360°\cdot S\cdot x/X + 0\cdot\varphi+g_{s,m}\cdot\delta) \\ \overline{a}\cdot\sin(360°\cdot S\cdot x/X + 1\cdot\varphi+g_{s,m}\cdot\delta) \\ \vdots \\ \overline{a}\cdot\sin(360°\cdot S\cdot x/X + (K-1)\cdot\varphi+g_{s,m}\cdot\delta) \end{pmatrix} \quad (1)$$

According to the Addition theorem of trigonometry:

$$\sin(\alpha+\beta) = \cos(\alpha)\sin(\beta)+\sin(\alpha)\cos(\beta) = (\cos(\alpha)\ \sin(\alpha))\begin{pmatrix}\sin(\beta)\\ \cos(\beta)\end{pmatrix}$$

By equivalent transformation of (1) it derives $$\vec{Q}_m =$$

$$\underbrace{\begin{pmatrix} \cos(0\cdot\varphi) & \sin(0\cdot\varphi) \\ \cos(1\cdot\varphi) & \sin(1\cdot\varphi) \\ \vdots & \vdots \\ \cos((K-1)\cdot\varphi) & \sin((K-1)\cdot\varphi) \end{pmatrix}}_{H} \underbrace{\begin{pmatrix} \overline{a}\cdot\sin(360°\cdot S\cdot x/X+g_{s,m}\cdot\delta) \\ \overline{a}\cdot\cos(360°\cdot S\cdot x/X+g_{s,m}\cdot\delta) \end{pmatrix}}_{\vec{\Psi}_m}$$

With known constant matrix H and unknown two-dimensional phase-vector $\vec{\Psi}_m$.

In case of K=2 and $\phi=90°$ H becomes the unit matrix and the simple relationship holds $$\vec{Q}_m = \vec{\Psi}_m$$

In the general case, the phase vector $\vec{\Psi}_m$ may be computed by means of the pseudo-inverse (Moore-Penrose-Inverse) $H^+$:

$$\vec{\Psi}_m = H^+ \cdot \vec{Q}_m$$

The precondition for an univocal solution for $\vec{\Psi}_m$ is that the rank of H is higher than 1. This is exactly the case when: K≥2 and 1$\phi$ mod 180°≠0.

For the calculation of s there are now two possibilities.
Method A

The oriented angle between the 0-th phase vector $\vec{\Psi}_0$ and the m-th phase vector $\vec{\Psi}_m$ corresponds to the phase jump $g_{s,m}\delta$:

$$g_{s,m}\delta = \sphericalangle(\vec{\Psi}_0, \vec{\Psi}_m) \bmod 360° \quad (2)$$

The angular function $\sphericalangle(\vec{a}\,\vec{b})$ herein describes the positive directed angle in two dimensions of vector $\vec{a}$ after vector $\vec{b}$ in the mathematically positive sense of rotation. This angle may be computed, for example, by means of the known a tan 2-function:

$$\sphericalangle\left(\begin{pmatrix}a_x\\a_y\end{pmatrix}, \begin{pmatrix}b_x\\b_y\end{pmatrix}\right) = [\operatorname{atan2}(a_x b_y - a_y b_x, a\,b + a_y b_y) + 360°] \bmod 360°$$

For the calculation of the sought projection fringe s, the numerical value s∈{0, 1, . . . , S−1} is now selected, for which the congruence equation (2) is solved for all m∈{0, 1, . . . , M−1}.
Method B More robust is determination of s by means of maximization. To this end, the intensity vector $\vec{\Psi}_0$ of the reference signal is rotated in such a way that, if s is appropriately selected, it is directed in the same direction as $\vec{\Psi}_m$ and in this case the scalar product <.,.> is maximized.

$$s = \arg\max_{\tilde{s}\in(0, \ldots, S-1)} \sum_{m=1}^{M-1} \left\langle \begin{pmatrix} \cos(g_{\tilde{s},m}\cdot\delta) & -\sin(g_{\tilde{s},m}\cdot\delta) \\ \sin(g_{\tilde{s},m}\cdot\delta) & \cos(g_{\tilde{s},m}\cdot\delta) \end{pmatrix} \vec{\Psi}_0, \vec{\Psi}_m \right\rangle$$

After calculating the projector fringe s, the x-coordinate of pattern may be determined by a calculation method known from the phase-shift approach. To this end, it is sufficient to observe the 0-th intensity vector. The formula $$x = \left[s + \sphericalangle\left(\begin{pmatrix}1\\0\end{pmatrix}\cdot\vec{\Psi}_0\right)\bigg/360°\right]\cdot X/S$$

Then provides the x-coordinate of the projected pattern, which is detected by the camera pixel.

From the so computed x-coordinate of projectors and the coordinate of the camera pixel, the spatial position of camera 16 and projector 10, which is determined by a calibration measurement, as well as the imaging properties of camera 16 and projector 10, the coordinates of P are then determined as known, by triangulation. This method is automatically performed by means of the controller 18 for all pixels of camera 18 and thus coordinates of points P of surface 20 are calculated. The point cloud thus formed describes the topography of body 12.

REFERENCE LIST 10 fringe projection device
12 body
14 projector
16 camera
18 controller
20 surface
22 time ray
24 camera image
28 observation ray
30 light plane
β phase position
δ phase shift parameter
φ difference angle
a real number
b real number
c real number
g function assigning to a number its Gray code
$g_{s,m}$ m-th position of the Gray code of s
k index of pattern within set
K number of patterns for each set
L longitudinal direction of fringe
m index of set
M number of sets
N number of symbols of code-alphabet
p function
P point on surface
$\vec{Q}_{k,m}$ detected intensity
$Q_{proj}$ projected light intensity
t time
s index of fringes
S number of fringes
T pattern
x pattern coordinate
X width of pattern, or largest coordinate possible
y pattern coordinate, parallel to fringe

The invention claimed is:
1. A fringe projection method for determining the topography of a body comprising:
   projecting a sequence of sets of patterns onto a surface of the body, wherein each of the sets of patterns has at least two projected patterns and wherein each of the at least two projected patterns has the same total number of fringes;
   for each pattern, recording an image of the surface having the projected pattern to form a sequence of recordings; and
   determining the topography of the body from the sequence of recordings, wherein each fringe has an intensity distribution perpendicular to the fringe longitudinal direction and each intensity distribution is expressed by a spatial phase position, wherein the spatial phase position is a function of an ordinal number corresponding to the fringe, and wherein the spatial phase position depends on a single position of a code word corresponding to the ordinal number.

2. The fringe projection method of claim 1, wherein:
the expression of the spatial phase position is periodic; and
the intensity distributions of patterns of a set have the same spatial frequency.

3. The fringe projection method of claim 1, wherein the phase positions for all patterns within each of the sets are different from each other.

4. The fringe projection method of claim 1, wherein a phase position in a s-th fringe of a k-th pattern within a m-th set contains a sum of a first term, which contains s, however does not contain k, and a second term, which contains k, however does not contain s or m, wherein:
k is an index of a pattern within a set;
s is an index of a fringe; and
m is an index of a set.

5. The fringe projection method of claim 4, wherein the phase position for the s-th fringe of the k-th pattern within the m-th set contains term $$\frac{360°Sx}{X} + k\varphi + g_{s,m}\delta,$$

wherein:
S is a total number of fringes (s=0,1, . . . , S−1);
x is a coordinate perpendicular to a longitudinal direction of a fringe;
X is an upper interval limit of x values, $(x \in \{0, \ldots, X\})$;
$\varphi$ is a difference angle where $\varphi$ mod 360°≠0°;
$g_{s,m}$ is a m-th position of a Gray code of s; and
$\delta$ is a phase shift parameter, where $\delta$ mod 360°≠0°.

6. The fringe projection method of claim 5, wherein the intensity distribution of the k-th pattern within the m-th set is expressed by:

$$Q_{k,s,m}(x)) = a \cdot p\left[\frac{360°S}{X}x + k\varphi + g_{s,m}\delta\right]$$

wherein:
Q is an intensity;
x is an x-coordinate of a pattern;
p is a 360°-periodic trigonometric function;
a is a constant with a real value;
b is a constant with a real value; and
c is a constant with a real value.

7. The fringe projection method of claim 6, wherein a shift parameter is expressed by:

$$|\delta| \le \frac{360°}{N-1},$$

wherein N is a number of symbols of a code-alphabet.

8. A fringe projection device for determining the topography of a body, comprising:
a projector for projecting a sequence of sets of patterns onto the surface of the body;
a camera for recording an image of the surface having the projected pattern; and
a computer, which is connected to the projector and the camera configured to:
project a sequence of sets of patterns onto a surface of the body, wherein each of the sets of patterns has at least two projected patterns and wherein each of the at least two projected patterns has the same total number of fringes;
for each of the sequence of sets of patterns, record an image of the surface having the projected patterns to form a sequence of recordings; and
determine the topography of the body from the sequence of recordings, wherein each fringe has an intensity distribution perpendicular to the fringe longitudinal direction and each intensity distribution is expressed by a spatial phase position, wherein the spatial phase position is a function an ordinal number corresponding to the fringe, and wherein the spatial phase position depends on a single position of a code word corresponding to the ordinal number.

9. A non-transitory computer readable medium comprising instructions that if executed cause a controller to:
project a sequence of sets of patterns onto a surface of a body, wherein each of the sets of patterns has at least two projected patterns and wherein each of the at least two projected patterns has the same total number of fringes;
for each of the sequence of sets of patterns, record an image of the surface having the projected patterns to form a sequence of recordings; and
determine the topography of the body from the sequence of recordings, wherein each fringe has an intensity distribution perpendicular to the fringe longitudinal direction and each intensity distribution is expressed by a spatial phase position, wherein the spatial phase position is a function an ordinal number corresponding to the fringe, and wherein the spatial phase position depends on a single position of a code word corresponding to the ordinal number.

* * * * *